(12) United States Patent
Zheng et al.

(10) Patent No.: US 11,309,802 B2
(45) Date of Patent: Apr. 19, 2022

(54) TRANSFORMERS, CONVERTERS, AND IMPROVEMENTS TO THE SAME

(71) Applicant: Georgia Tech Research Corporation, Atlanta, GA (US)

(72) Inventors: Liran Zheng, Atlanta, GA (US); Deepakraj M. Divan, Atlanta, GA (US); Rajendra Prasad Kandula, Atlanta, GA (US); Karthik Kandasamy, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/262,523

(22) PCT Filed: Jul. 23, 2019

(86) PCT No.: PCT/US2019/042969
§ 371 (c)(1),
(2) Date: Jan. 22, 2021

(87) PCT Pub. No.: WO2020/023471
PCT Pub. Date: Jan. 30, 2020

(65) Prior Publication Data
US 2021/0273574 A1    Sep. 2, 2021

Related U.S. Application Data

(60) Provisional application No. 62/701,958, filed on Jul. 23, 2018.

(51) Int. Cl.
*H02M 5/458* (2006.01)
*H02M 1/00* (2006.01)
(Continued)

(52) U.S. Cl.
CPC .............. *H02M 5/458* (2013.01); *H02J 3/381* (2013.01); *H02M 1/0058* (2021.05); *H02M 1/44* (2013.01); *H02J 2300/24* (2020.01)

(58) Field of Classification Search
CPC ...................................................... H02M 5/458
(Continued)

(56) References Cited

U.S. PATENT DOCUMENTS

| 4,937,719 A | 6/1990 | Yamada et al. |
| 2006/0158127 A1 | 7/2006 | Xu et al. |

(Continued)

FOREIGN PATENT DOCUMENTS

| WO | 2017/049191 | 3/2017 |
| WO | 2017/201209 | 11/2017 |

OTHER PUBLICATIONS

Search Report and Written Opinion from Application No. PCT/US2019/042969 dated Oct. 10, 2019, (17 pages).

*Primary Examiner* — Joseph Chang
(74) *Attorney, Agent, or Firm* — Troutman Pepper Hamilton Sanders LLP; Ryan A. Schneider

(57) ABSTRACT

A soft-switching solid-state power transformer, including: a high-frequency (HF) transformer comprising first and second winding connections; a first auxiliary resonant circuit coupled to the first winding connection, the first auxiliary resonant circuit comprising: a resonant capacitor coupled across the first winding connection, a resonant inductor coupled across the first winding connection in parallel with the resonant capacitor, and a damping feature coupled across the first winding connection in series with the resonant capacitor and the resonant inductor; a first current-source inverter (CSI) bridge coupled to the first auxiliary resonant circuit, the first CSI bridge comprising reverse blocking switches configured to conduct current in one direction and block voltage in both directions; a second auxiliary resonant (Continued)

circuit coupled to the second winding connection; and a second CSI bridge coupled to the second auxiliary resonant circuit, the second CSI bridge comprising reverse blocking switches.

33 Claims, 10 Drawing Sheets

(51) Int. Cl.
    *H02J 3/38*     (2006.01)
    *H02M 1/44*     (2007.01)

(58) Field of Classification Search
    USPC .......................................................... 307/52
    See application file for complete search history.

(56) References Cited

U.S. PATENT DOCUMENTS

| | | | |
|---|---|---|---|
| 2013/0038289 A1 | 2/2013 | Tse et al. | |
| 2013/0100717 A1* | 4/2013 | Lee | H02M 5/4585 |
| | | | 363/37 |

* cited by examiner

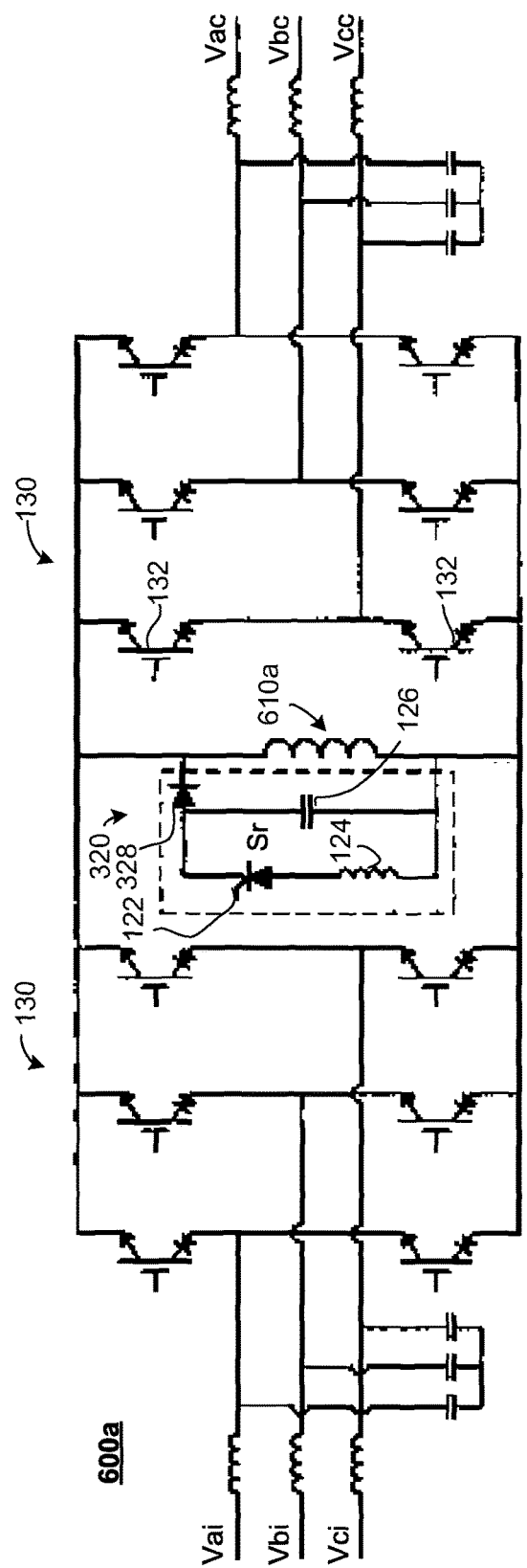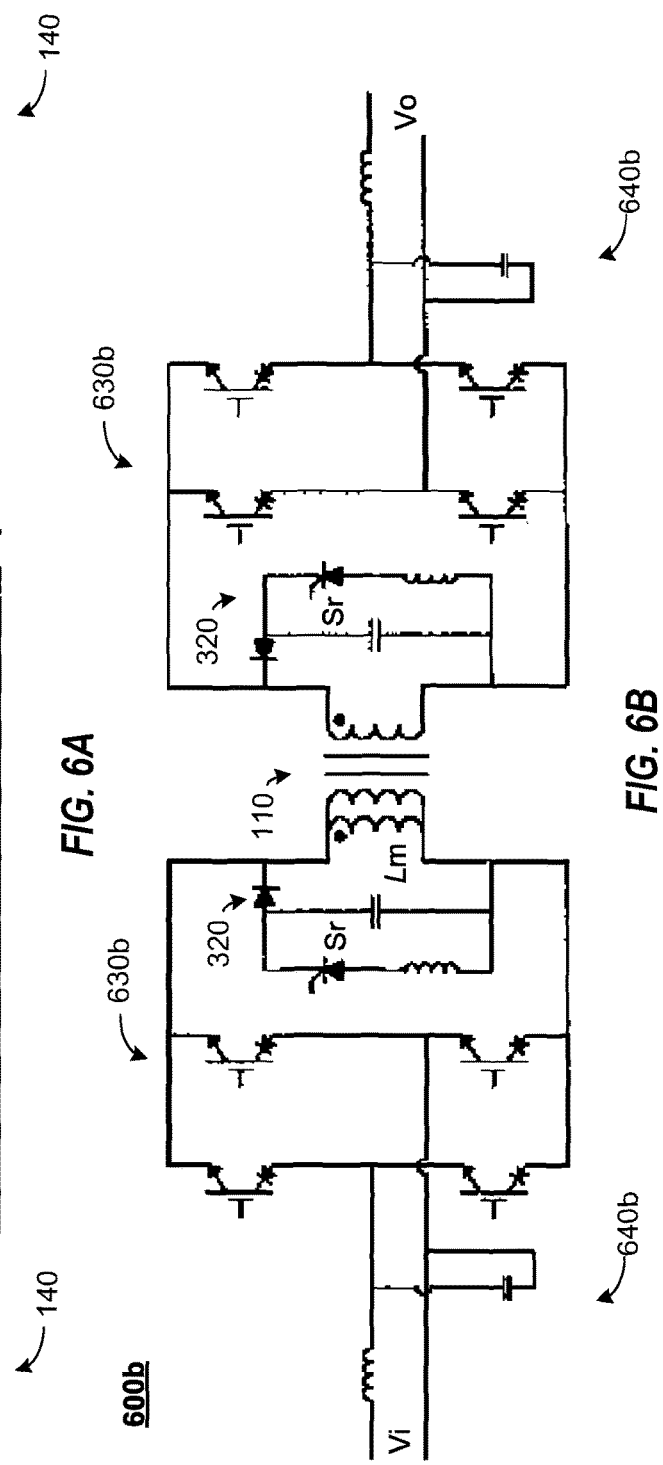
FIG. 6A
FIG. 6B

700

800

900

TRANSFORMERS, CONVERTERS, AND IMPROVEMENTS TO THE SAME

CROSS-REFERENCE TO RELATED APPLICATIONS

The present application claims the benefit of U.S. Provisional Patent Application No. 62/701,958, filed Jul. 23, 2018, which is incorporated by reference herein in its entirety.

TECHNICAL FIELD

Aspects of the present disclosure relate generally to power converters and transformers, and more specifically to converters and transformers structured to address resonant damping, power efficiencies, and power balancing.

BACKGROUND

Power converters that include galvanic isolation cover a broad range of applications from customer electronics to bulky power system. The converter can be capable of connecting with direct current (DC), single-phase and/or multi-phase alternating current (AC) power sources or loads. When compared with low-frequency isolation links, high-frequency isolation can result in significant savings in volume and weight of magnetic materials. In addition, the converter/inverter bridges provide various intelligence such as bi-directional power flow control, harmonic suppression, VAr support, DC and multi-terminal interfacing, voltage regulation, and fault isolation. Certain aspects of power converters, and in particular of soft-switching solid-state transformers and converters, are described in U.S. Provisional Patent Application No. 62/337,512, filed May 17, 2016, Application No. PCT/US17/33186 filed May 17, 2017, and U.S. application Ser. No. 16/302,356 filed Nov. 16, 2018, the disclosures of which are incorporated herein by reference as if set forth below in their entireties.

However, attempts to address resonant dampening in the related art has resulted in efficiency losses. Additionally, in the related art, power balancing with stacked or multi-phase applications demands separate capacitors in each stage, with no ability to share power between modules. Accordingly, improvements to the efficiency and compactness of related art converters are desired.

SUMMARY

Aspects of the present disclosure are related to transformers and converters, and their operation and application. In an embodiment, there is provided: a soft-switching solid-state power transformer, including: a high-frequency (HF) transformer including first and second winding connections; a first auxiliary resonant circuit coupled to the first winding connection of the HF transformer, the first auxiliary resonant circuit including: a resonant capacitor coupled across the first winding connection, a resonant inductor coupled across the first winding connection in parallel with the resonant capacitor, and a damping feature coupled across the first winding connection in series with the resonant capacitor and the resonant inductor; a first current-source inverter (CSI) bridge coupled to the first auxiliary resonant circuit, the first CSI bridge including reverse blocking switches configured to conduct current in one direction and block voltage in both directions; a second auxiliary resonant circuit coupled to the second winding connection of the HF transformer; and a second CSI bridge coupled to the second auxiliary resonant circuit, the second CSI bridge including reverse blocking switches configured to conduct current in one direction and block voltage in both directions.

In an embodiment, there is provided: a reactive power compensator, including: a high-frequency (HF) transformer including first, second and third winding connections; a first auxiliary resonant circuit coupled to the first winding connection of the HF transformer, the first auxiliary resonant circuit including: a resonant capacitor coupled across the first winding connection, a resonant inductor coupled across the first winding connection in parallel with the resonant capacitor, and a damping feature coupled across the first winding connection in series with the resonant capacitor and the resonant inductor; a first current-source inverter (CSI) bridge coupled to the first auxiliary resonant circuit, the first CSI bridge including reverse blocking switches configured to conduct current in one direction and block voltage in both directions; a second auxiliary resonant circuit coupled to the second winding connection of the HF transformer; a second current-source inverter (CSI) bridge coupled to the second auxiliary resonant circuit, the second CSI bridge including reverse blocking switches configured to conduct current in one direction and block voltage in both directions; a third auxiliary resonant circuit coupled to the third winding connection of the HF transformer; and a third CSI bridge coupled to the third auxiliary resonant circuit, the third CSI bridge including reverse blocking switches configured to conduct current in one direction and block voltage in both directions.

In an embodiment, there is provided: a soft-switching solid-state converter, including: an auxiliary resonant circuit coupled across an inductor, the auxiliary resonant circuit including: a resonant capacitor coupled across the inductor, a resonant inductor coupled across the inductor in parallel with the resonant capacitor, and a damping feature coupled across the inductor in series with the resonant capacitor and the resonant inductor; a first current-source inverter (CSI) bridge coupled across the inductor, the first CSI bridge including reverse blocking switches configured to conduct current in one direction and block voltage in both directions; and a second CSI bridge coupled across the inductor, the second CSI bridge including reverse blocking switches configured to conduct current in one direction and block voltage in both directions.

In an embodiment, there is provided: a stacked converter including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including first, second, and third phase legs; and a shared capacitor, the shared capacitor coupled to the second phase leg of the first CSI bridge of each of the first and second converter modules.

In an embodiment, there is provided: a stacked converter including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including first, second, and third phase legs; and a shared battery, the shared battery coupled to the second phase leg of the first CSI bridge of each of the first and second converter modules.

In an embodiment, there is provided: a modular-stacked multi-stage converter including: a first stage and a second stage, each of the first stage and the second stage including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including three phase legs; and a shared capacitor, the shared capacitor coupled to the second phase leg of the first CSI bridge of each of the first and second converter modules of each of the first and second stages.

In an embodiment, there is provided: a modular-stacked multi-stage converter including: a first stage and a second stage, each of the first stage and the second stage including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including first, second, and third phase legs; and a shared battery, the shared battery coupled to the second phase leg of the first CSI bridge of each of the first and second converter modules of each of the first and second stages.

In an embodiment, the first auxiliary resonant circuit includes a reverse blocking switch coupled across the first winding connection in series with the resonant inductor and in parallel to the resonant capacitor.

In an embodiment, the damping feature includes a damping diode and in series to the resonant capacitor and the resonant inductor.

In an embodiment, the damping feature includes a synchronous rectifier coupled across the first winding connection in series with the resonant capacitor and the resonant inductor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 6A-6E illustrate example schematic diagrams for various applications of converters and transformers including leakage inductance compensation in accordance with an embodiment of the present disclosure.

DETAILED DESCRIPTION

The present disclosure can be understood more readily by reference to the following detailed description of one or more example embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting. Some example embodiments of the disclosed technology will be described more fully hereinafter with reference to the accompanying drawings. The disclosed technology might be embodied in many different forms and should not be construed as limited to the example embodiments set forth herein.

Figure 1:
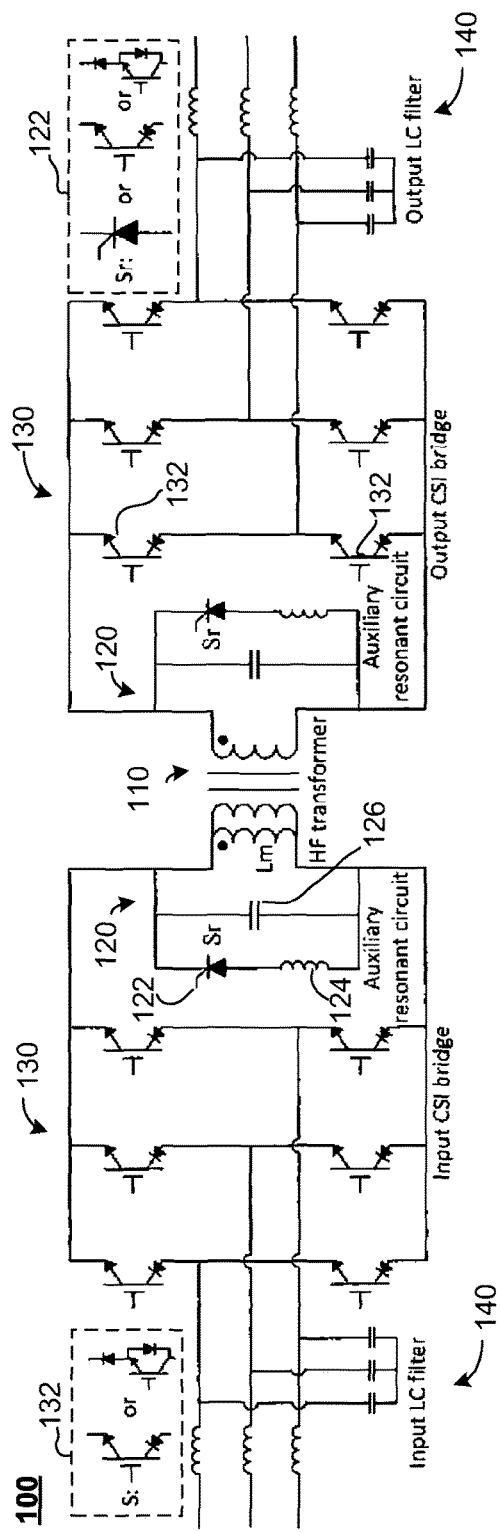
FIG. 1 is a schematic diagram illustrating a soft-switching isolated transformer topology in the related art.

Referring to FIG. 1, shown is an example of a soft-switching isolated converter topology 100 in the related art. An isolated transformer or converter 100 includes of four elements: 1) a high-frequency (HF) transformer 110 (e.g., a multi-winding HF transformer) to provide galvanic isolation and an amount of energy storage; 2) current-source inverter (CSI) bridges 130 to interlace with sources and loads; 3) terminal LC filters 140 for suppressing harmonics; and 4) auxiliary resonant circuits 120 to provide ZVS switching conditions for all the main devices. The CSI bridges 130 are configured with switches S 132 in the phase legs that conduct current in one direction but block voltage in both directions, which can be implemented, for example, with either an insulated gate bipolar transistor (IGBT) in series with a diode 134 or a reverse blocking IGBT (RB-IGBT) or an equivalent mechanism. The IGBT and/or diodes can be formed with silicon, silicon carbide, and/or a wide-bandgap semiconductor. The auxiliary resonant circuits 120 include an active device Sr 122 (e.g., a reverse blocking switch or reverse blocking switch assembly), an inductor 124 (e.g., resonant inductor 124) and a capacitor 126 (e.g., resonant capacitor 126). The active device Sr 122 can be an IGBT in series with a diode, an RB-IGBT, a thyristor, or the like. Two auxiliary resonant circuits 120 can be required to provide ZVS transitions for the devices of the input and output CSI bridges 130, respectively, due to the transformer leakage inductance. While FIG. 1 illustrates a topology applicable to a 3-phase to 3-phase converter, one of ordinary skill will recognize that alternative configurations (such as 1-phase versions, VAR compensators, DC-AC, DC-DC, and non-isolated topologies) are known in the related art.

It is desirable to keep transformer leakage inductance low. If low leakage inductance cannot be maintained, it will tend to significantly resonate with the capacitors at transitions. When considering the transformer leakage effect, the capacitor of the auxiliary resonant circuit 120 can sink the transformer leakage energy in a passive manner. This avoids using an additional leakage management strategy and thus eliminates all the associated issues. During the transition from one CSI bridge 130 to another CSI bridge 130, the two resonant capacitors 126 located on the primary and secondary sides of the HF transformer 110, will be simultaneously charged by the magnetizing inductance. However, during the transition, the leakage inductance will tend to resonate with these two capacitors in the auxiliary resonant circuits 120. If the HF transformer 110 is designed to have low leakage inductance, the resonance can be neglected. However, if the leakage inductance is non-negligible, the resonance can cause the winding current of one CSI bridge 130 to flow in a reverse direction, and thus the winding current of the other CSI bridge 130 is higher than the magnetizing current. This phenomenon can result in a failure in the operation for the converters. To overcome a severe resonant issue, the related art suggests providing two additional diodes Dri and Dro connected in series with the HF transformer 110 to stop the resonance.

Figure 2:
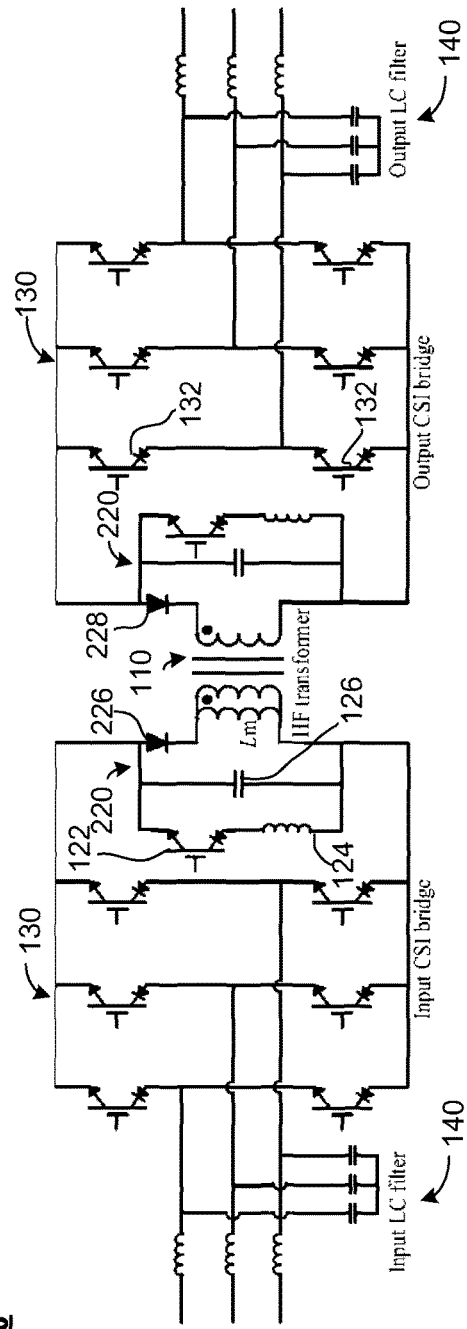
FIG. 2 is a schematic diagram illustrating leakage inductance compensation for transformer and converter topologies in the related art.

FIG. 2 illustrates the placement of the two diodes Dri and Dro to provide resonance damping according to the related art. The topology 200 of FIG. 2 includes 1) an HF transformer 110; 2) CSI bridges 130; 3) terminal LC filters 140; and 4) auxiliary resonant circuits 220. HF transformer 110, CSI bridges 130, and terminal LC filters 140 are substantially similar to those discussed above with reference to FIG. 1. However, auxiliary resonant circuits 220 includes damping diodes Dri 226 and Dro 228 inserted between the HF transformer 110 and the auxiliary resonant circuits 220 in the related art. However, it has been found that the placement of the two diodes Dri and Dro 226 and 228 in the related art within the main current path can increase the converter conduction losses by as a much as 20%. Accordingly, there is a need to provide alternative solutions to provide resonance damping.

Figure 3:
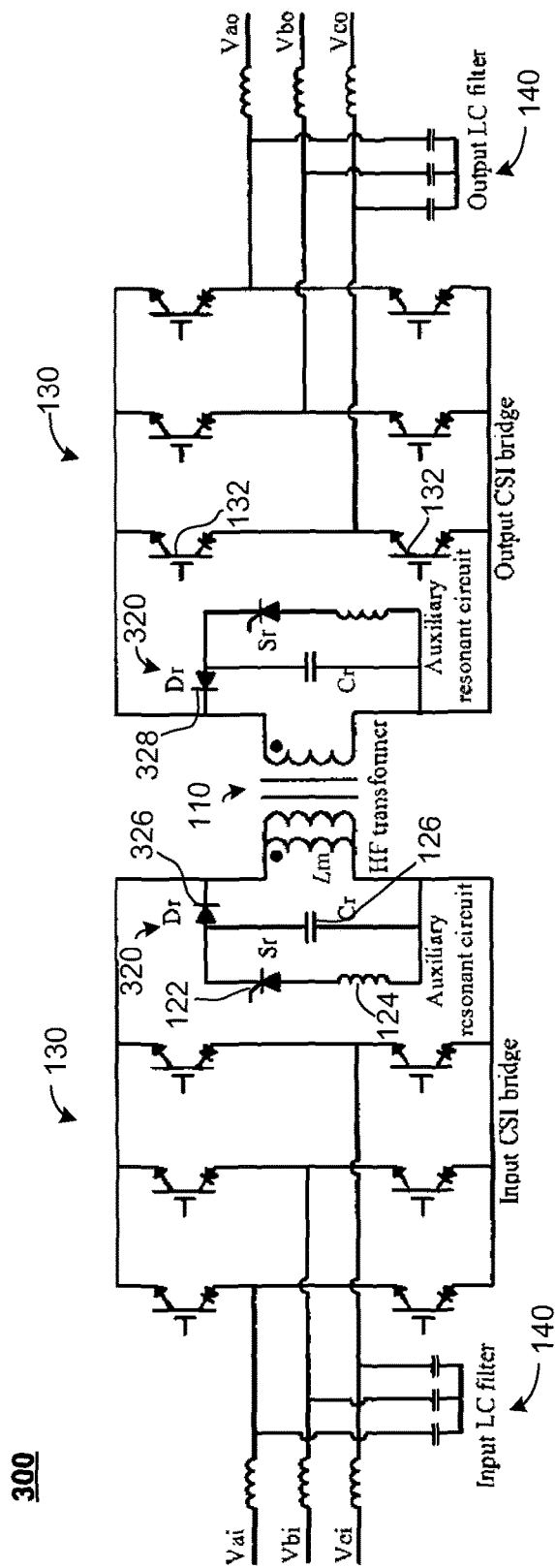
FIG. 3 is a schematic diagram illustrating an example soft-switching isolated transformer topology with leakage inductance compensation according to an embodiment.

To that end, FIG. 3 is a schematic diagram illustrating an example soft-switching isolated transformer topology 300 with leakage inductance compensation according to an embodiment. The topology of FIG. 3 includes 1) a HF transformer 110; 2) CSI bridges 130; 3) terminal LC filters 140; and 4) auxiliary resonant circuits 320. HF transformer 110, CSI bridges 130, and terminal LC filters 140 are substantially similar to those discussed above with reference to FIGS. 1 and 2. However, FIG. 3 includes damping diodes Dri 326 and Dro 328 placed within auxiliary resonant circuits 320 between the resonant capacitor Cr and the transformer. Accordingly, the line current does not flow through Dri 326 or Dro 328, but rather current flows through Dri 326 and Dro 328 only during transition and/or resonant periods, thereby reducing additional conduction loss by the presence of Dri 326 and Dro 328. The inventors surprisingly found that moving the resonance diodes outside of the line current path maintained the resonance damping qualities of the additional diodes.

Figure 4:
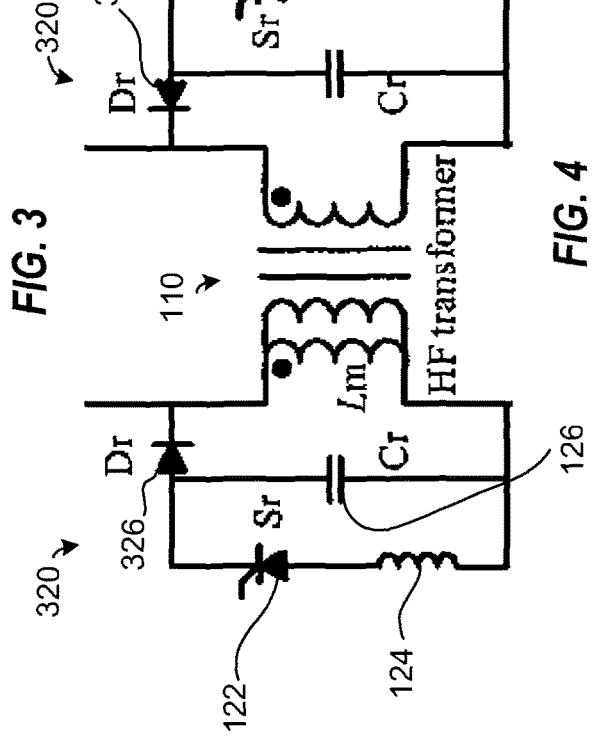
FIG. 4 is a schematic diagram illustrating leakage inductance compensation for transformer and converter topologies in accordance with an embodiment.

FIG. 4 is an enlarged schematic diagram of HF transformer 110 and auxiliary resonant circuits 320 according to an embodiment.

Figure 5B:
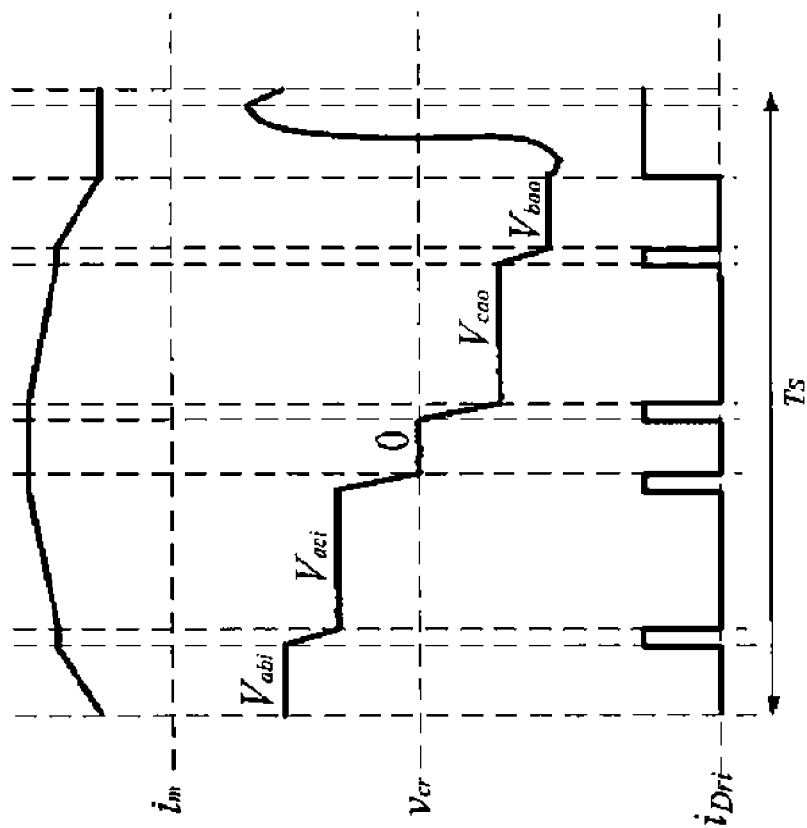
FIGS. 5A and 5B illustrate current timing diagrams through inductance compensation diodes in accordance with the related art approaches and an embodiment of the present disclosure.
Figure 5A:
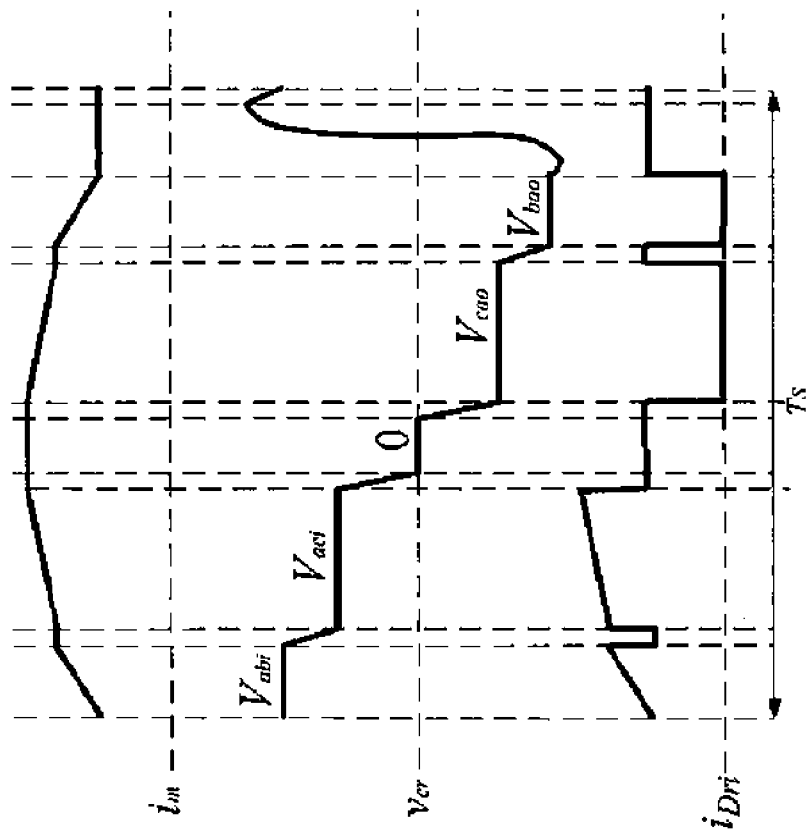

FIGS. 5A and 5B are timing charts 500a and 500b illustrating current flowing through Dri 226 in the related art architecture and Dri 326 in an embodiment of the present disclosure, respectfully. As can be seen in FIG. 5A, in the related art, current flows through diode Dri 226 during a significant portion much of the transformer cycle. In comparison, in an embodiment of the present disclosure, current $i_{Dri}$ flows through diode Dri 326 only during periods of transition and resonance (see FIG. 5B).

While FIG. 3 illustrates a topology applicable to a 3-phase to 3-phase converter, in light of the present disclosures, one of ordinary skill will recognize that alternative configurations (such as 1-phase versions, VAR compensators, DC-AC, DC-DC, and non-isolated topologies) utilizing the resonance damping capacitor configuration illustrated in FIGS. 3 and 4 are considered within the scope of the present disclosure. As non-limiting examples, FIGS. 6A-6E illustrate schematic diagrams for various applications of converters and transformers including leakage inductance compensation in accordance with an embodiment of the present disclosure.

FIG. 6A is a schematic diagram 600a of a non-isolated soft-switching isolated transformer topology according to an embodiment. The topology of FIG. 6A can be suitable for conversion of three-phase AC power to three-phase AC power, in a case where high-frequency isolation is not needed.

The topology of FIG. 6A includes 1) an inductor 610 instead of an HF transformer 110; 2) CSI bridges 130; 3) terminal LC filters 140; and 4) a single auxiliary resonant circuit 320. Auxiliary resonant circuit 320, CSI bridges 130, and terminal LC filters 140 are substantially similar to those discussed above with reference to FIGS. 1-3.

FIG. 6B is a schematic diagram 600b of a 1-phase to 1-phase or DC-DC converter topology according to an embodiment. The topology of FIG. 6B can be suitable for conversion of DC or single-phase AC to DC or single-phase AC. The topology of FIG. 6B includes 1) an HF transformer 110; 2) CSI bridges 630b; 3) terminal LC filters 640b; and 4) auxiliary resonant circuits 320. HF transformer 110 and auxiliary resonant circuits 320 are substantially similar to those discussed above with reference to FIGS. 1-3. The number of phase legs of the CSI bridges 630b and the terminal LC filters 640b are reduced from those discussed above to correspond to the two-wire connections for the DC or single-phase AC input and output.

Figures 6C, 6D:
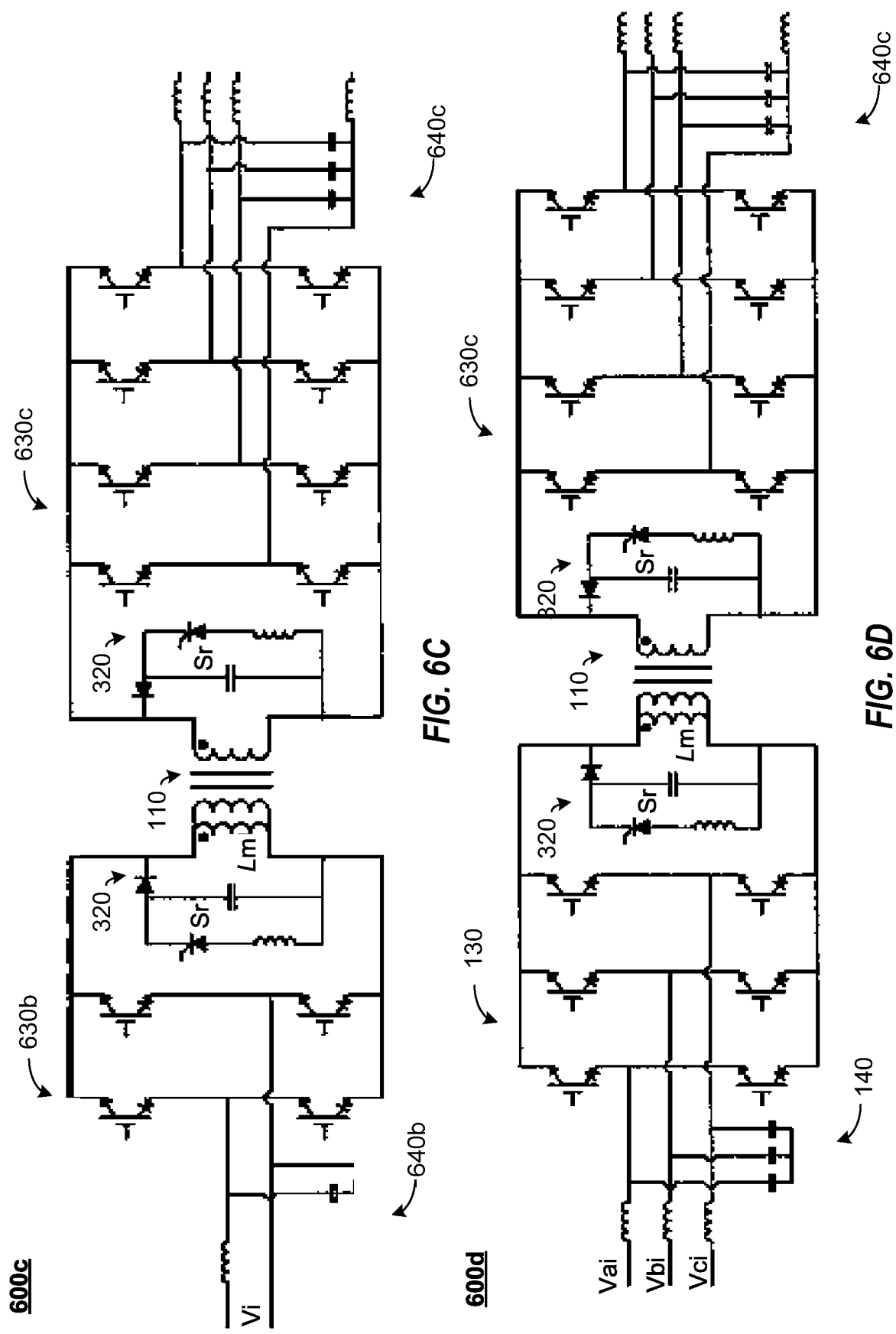

FIG. 6C is schematic diagram 600c for a four-wire three-phase AC configuration. As illustrated in FIG. 6C, a fourth phase leg has been added to the CSI bridge 630c for the neutral line on the three-phase AC side, which is coupled to the common point of the capacitors in the terminal LC filter 640c. The four-wire configuration can interface with an unbalanced three-phase AC system. The topology of FIG. 6C includes 1) an HF transformer 110; 2) CSI bridges 630b and 630c; 3) terminal LC filters 640b and 640c; and 4) auxiliary resonant circuits 320. HF transformer 110 and auxiliary resonant circuits 320 are substantially similar to those discussed above with reference to FIGS. 1-3. CSI bridge 630*b* and terminal LC filter 640*b* are substantially similar to those described above with reference to FIG. 6B.

FIG. 6D is schematic diagram 600*d* suitable for conversion of three-wire three-phase AC to four-wire three-phase AC. The topology of FIG. 6D includes 1) an HF transformer 110; 2) CSI bridges 130 and 630*c;* 3) terminal LC filters 140 and 640*c;* and 4) auxiliary resonant circuits 320. HF transformer 110, auxiliary resonant circuits 320, CSI bridge 130, and terminal LC filter 140 are substantially similar to those discussed above with reference to FIGS. 1-3. CSI bridge 630*c* and terminal LC filter 640*c* are substantially similar to those described above with reference to FIG. 6C.

Figure 6E:
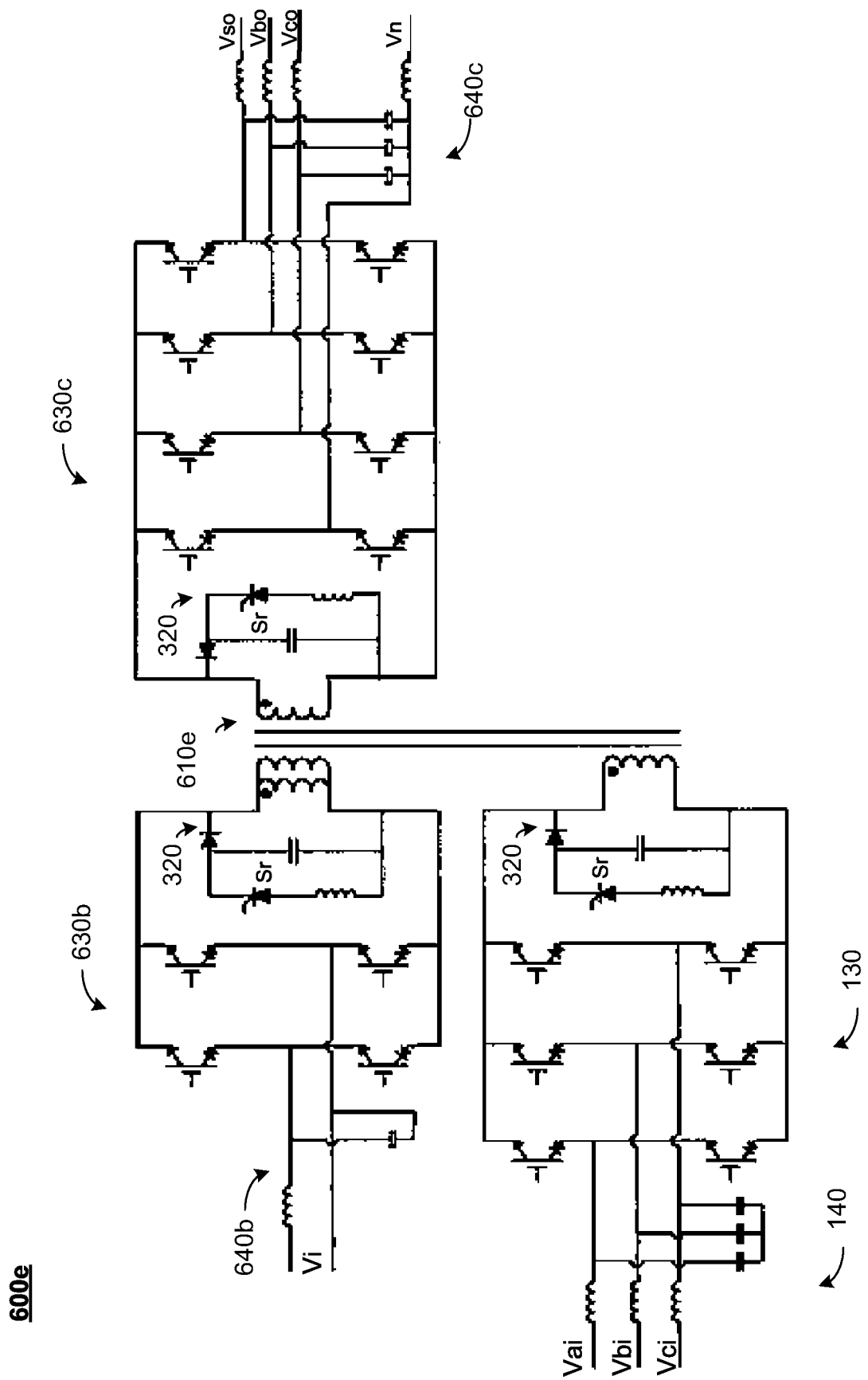

FIG. 6E is schematic diagram 600*e* of a three-port configuration suitable for conversion between DC or single-phase AC to DC, three-wire three-phase AC, and four-wire three-phase AC. The topology of FIG. 6D includes 1) a multi-winding HF transformer 610*e;* 2) CSI bridges 130, 630*b* and 630*c;* 3) terminal LC filters 140, 640*b,* and 640*c;* and 4) auxiliary resonant circuits 320. Auxiliary resonant circuits 320, CSI bridge 130, and terminal LC filter 140 are substantially similar to those discussed above with reference to FIGS. 1-3. CSI bridge 630*b* and terminal LC filter 640*b* are substantially similar to those described above with reference to FIG. 6B. CSI bridge 630*c* and terminal LC filter 640*c* are substantially similar to those described above with reference to FIG. 6C. Multi-winding HF transformer 610*e* provides isolation between the three sides of the converter. Additional ports or different conversion combinations can be provided as can be understood by one of ordinary skill in light of the present disclosure.

As can be understood, the illustrated topologies of FIGS. 6A-6E can be reversed or modified to provide for other converter configurations.

In an embodiment, Dri 326, Dro 328, or both can be replaced by respective synchronous rectifiers. As will be understood by one of ordinary skill, synchronous rectification, is a technique for improving the efficiency of rectification by replacing diodes with actively controlled switches such as transistors (e.g., powered by MOSFETs). Whereas normal diodes have a roughly fixed voltage drop (e.g., when in use), synchronous rectifiers can have arbitrarily low voltage drops (e.g., when the switch is closed). In an embodiment, the synchronous rectifiers 326 and/or 328 may be synchronized to active device Sr 122, such that the synchronous rectifiers 326 and/or 328 may turn on shortly (e.g., a few micro-seconds) after active device SR 122 and turn off shortly before (e.g., a few micro-seconds) active device SR 122. Accordingly, by replacing Dri 326 and/or Dro 328 with a synchronous rectifier, the efficiency of the transformer can be further increased. Damping diodes or synchronous rectifiers 326 and 328 may be referred to as damping features.

Furthermore, in some cases, one or more of the diodes 134 used in CSI bridges 130 (e.g., combined with the IGBT) in combination with the switches 132 can be replaced by respective synchronous rectifiers. The synchronous rectifiers 134 may be synchronized to the corresponding main switches 132, such that the synchronous rectifiers 134 may turn on shortly (e.g., a few micro-seconds) after switch 132 and turn off shortly before (e.g., a few micro-seconds) switch 132. As current flows through one or more diodes 134 while the transformer is active, the efficiency gains from replacing diodes 134 with synchronous rectifiers 134 can be more significant than the gains from replacing Dri 326 or Dro 328 with synchronous rectifiers 326 or 328.

Figure 7:
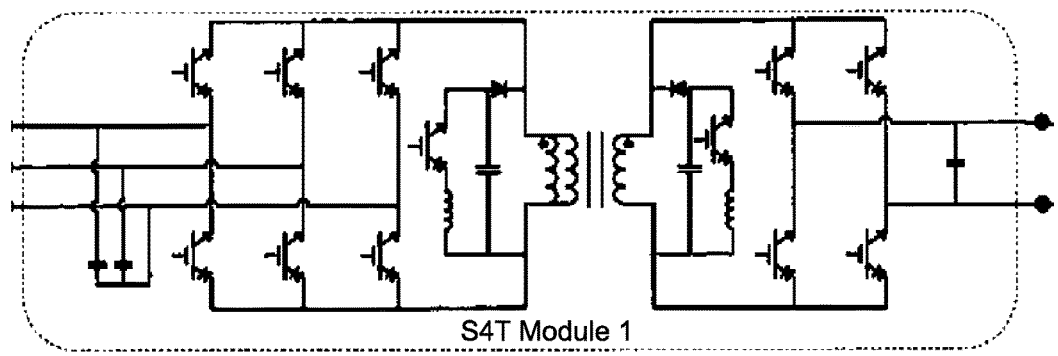
FIG. 7 is a schematic diagram illustrating a soft-switching isolated transformer topology I the related art.

FIG. 7 is a schematic diagram 700 illustrating a single module of a soft-switching isolated transformer topology. In the related art, individual modules of the soft-switching isolated transformer can be series connected on a medium voltage AC (MVAC) or MVDC side and parallel connected on a low voltage AC (LVAC) or LVDC side. Such related art stacked modules can be operated without a large energy storage element as a "low-inertia" converter, where the magnetizing inductance is low (relative to typical current source designs). The operating cycle of the soft-switching isolated transformer depends on the tight regulation of the transformer magnetizing current at the required DC value. The a three-phase soft-switching isolated transformer converter, the regulation of magnetizing current can be achieved using three-phase grid-voltage.

Figure 8:
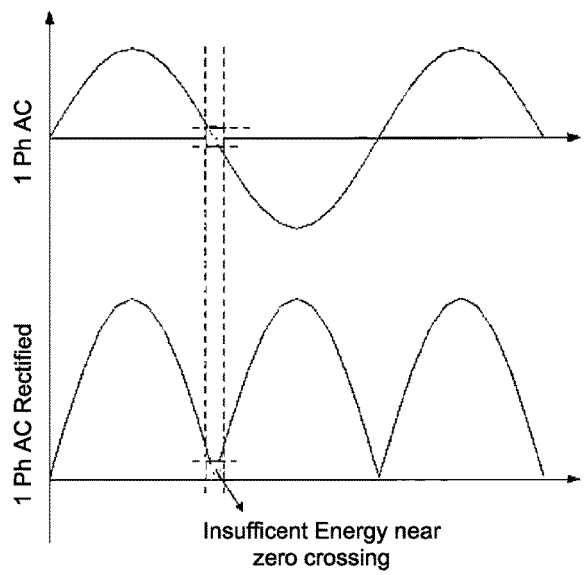
FIG. 8 is a timing chart illustrating energy insufficiency during zero-crossing in single-phase AC in the related art.
Figure 9:
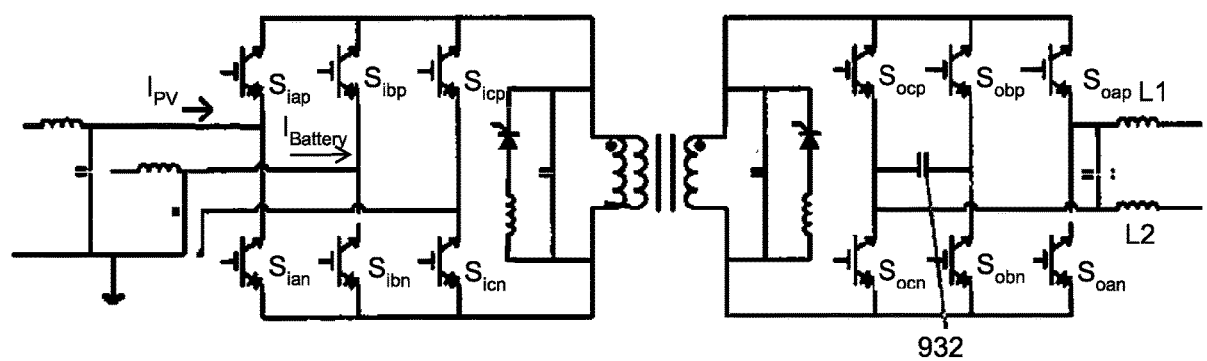
FIG. 9 illustrates a schematic diagram of a modified transformer having a third leg and power balancing capacitor according to the related art.
Figure 10:
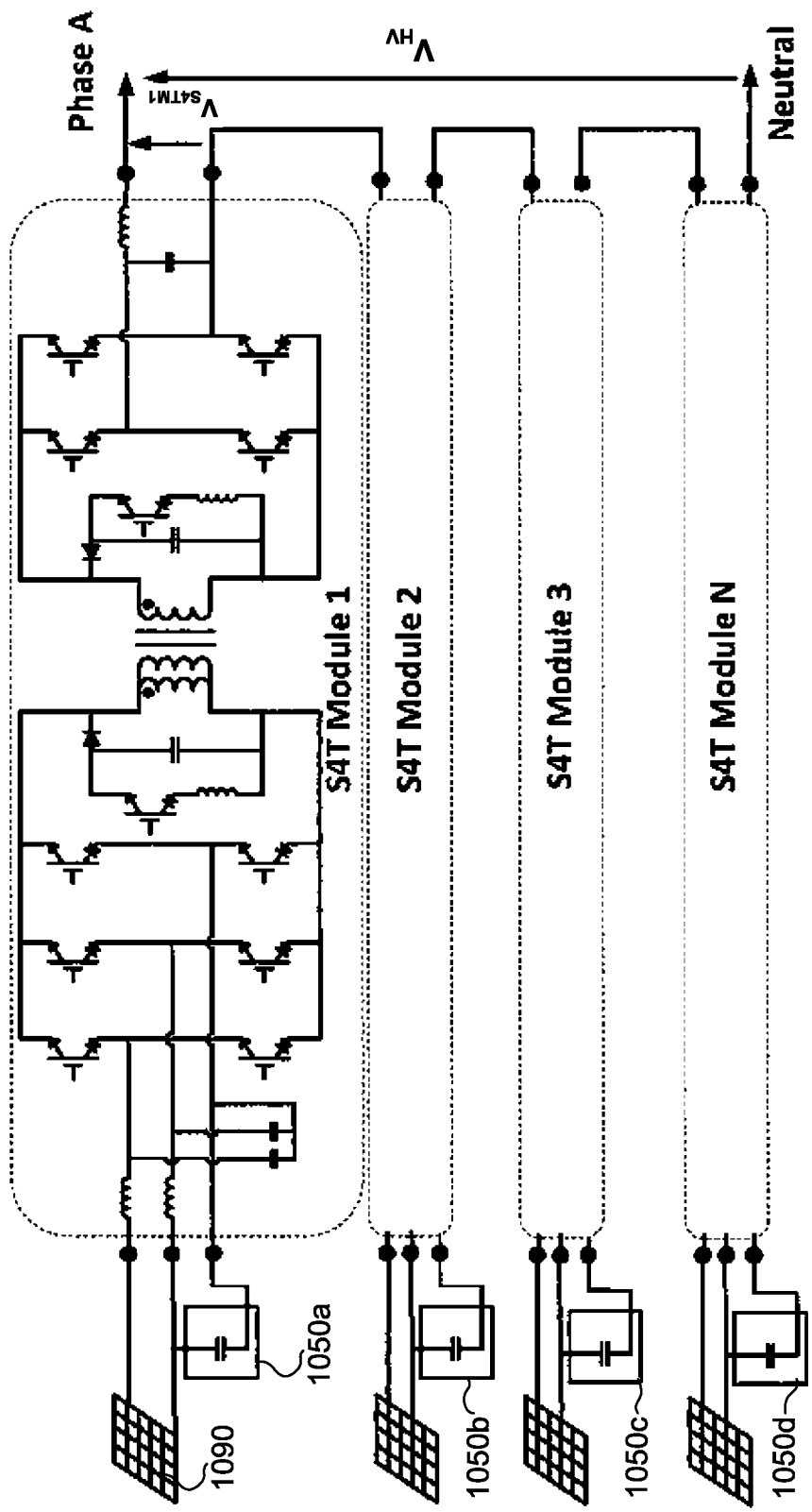
FIG. 10 is a schematic diagram of stacked single-phase converters in the related art.

However, with a single-phase AC connection on the HV side, transfer of power to the output and regulation of the magnetizing current are not possible around voltage zero crossing of the AC waveforms (as illustrated in the timing chart 800 of FIG. 8). To address this issue in the related art, a third leg is added to the two-leg single-phase converter connecting a power balancing capacitor. FIG. 9 illustrates a schematic diagram 900 of a modified transformer having the third leg and power balancing capacitor 932 according to the related art. The third-leg can be operated to provide instantaneous (or near-instantaneous) power balance even when the applied input voltage is near zero. However, the capacitor must handle the power fluctuations, requiring a Kilo Volt Ampere Reactive (KVAR) same as that of the Kilo volt-ampere (KVA) rating of the converter. FIG. 10 is a schematic diagram 1000 of stacked single-phase converters in the related art including an extra leg and capacitor 1050*a*-1050*d* per single-phase converter.

As will be understood by one of ordinary skill in light of the present disclosure, each capacitor 1050*a*-1050*d* must absorb a high level of current ripple at double the AC line frequency (e.g., 120 Hertz in the case of 60 Hertz systems). If single-phase converters are stacked (e.g., as shown in FIG. 10), then each converter needs its own capacitor. In this related-art configuration, each stacked converter has to operate on its own. Power cannot be shared between the stages. Additionally, in the related art, it is not possible to maintain stacked side voltages in a balanced way, especially with varying input power, such as in photovoltaic (PV) applications. Accordingly, there is a need for an improved architecture to address current ripple.

Figure 11:
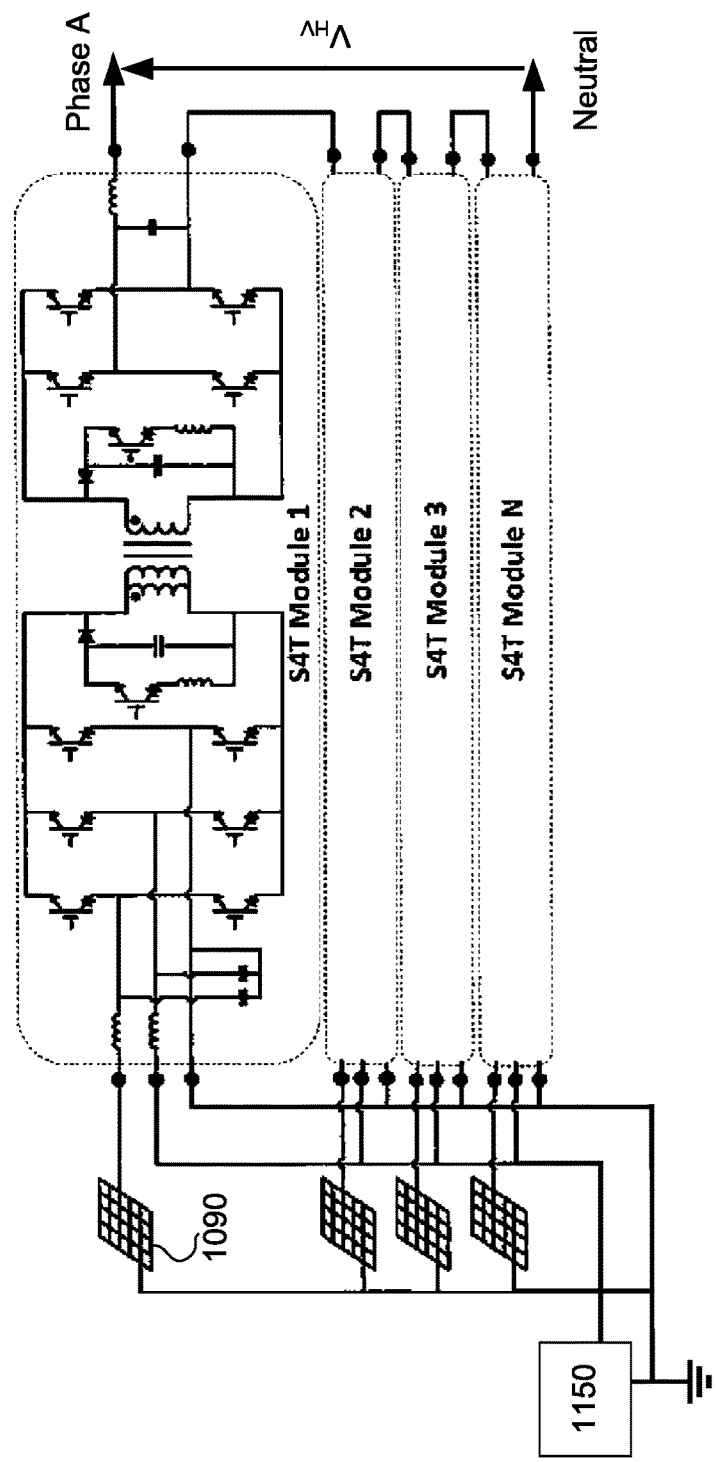
FIG. 11 is an example schematic drawing of stacked converter modules according to an embodiment.

FIG. 11 is an example schematic drawing 1100 of stacked converter modules according to an embodiment. In FIG. 11, a DC-side converter has an additional converter leg. One of the DC terminals coming from the PV panels is grounded. The second converted leg connects to a shared common capacitor 1150, replacing the multiple capacitors 1050*a*-1050*d* of the related art. The voltage across capacitor 1150 is controlled through joint action of all the converter modules. While capacitor 1150 can still be sized to handle power fluctuations, the current ripple flowing through the capacitor 1150 can be offset by the various modules. Accordingly, this reduces the amount of current circulating in capacitor 1150, allowing for a smaller capacitor 1150 than the capacitors 1050*a*-1050*d* required for each module in the related art. Additionally, in the case of soft-switching solid-state transformers, the voltage across capacitor 1150 can be set at any desired value across a broad range up to the device voltage rating, given that this topology is capable of buck-boost operation. As non-limiting examples, voltage across capacitor 1150 can be set to: below 70% of the device voltage rating; greater than 20% of the device voltage rating; or between 20% and 70% of the device voltage rating.

Furthermore, capacitor 1150 can be charged or discharged at will. Thus, in an embodiment, a battery (e.g., a shared battery) can be used instead of or in conjunction with capacitor 1150. By sharing a single battery across all the various converter modules can exchange power as needed and in the direction needed. This provides the additional benefit of greater flexibility in the operation of stacked soft-switching solid-state transformers topologies. For example, in a PV application, power can flow from PV panels 1090 to a power grid, while allowing the battery to float at a required voltage (e.g., 600 V). If energy in excess of grid needs is being produced by the PV panels, this excess power can be diverted to the battery. Meanwhile, in the grid required more power than currently being produced by the PV panels, power can be diverted from the battery to the grid. Furthermore, if certain PV panels are generating less energy than others (e.g., due to partial cloud coverage), the battery (or converter 1150) can take energy from the common DC bus, and actively balance the various stages soft-switching solid-state transformers stages.

Figure 12:
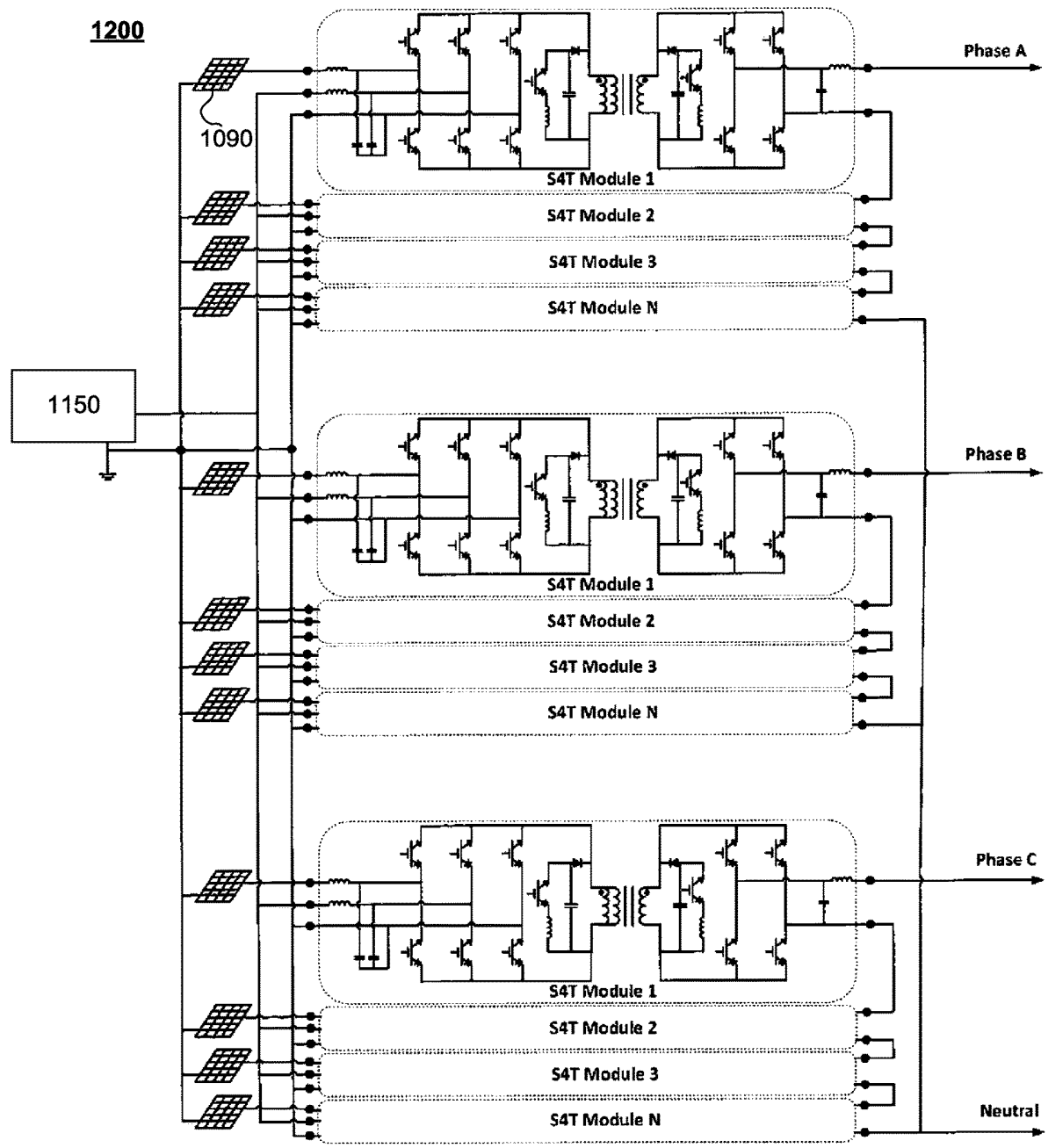
FIG. 12 is an example schematic drawing of a modular stacked three-phase converter according to an embodiment.

FIG. 12 is an example schematic drawing 1200 of a modular stacked multi-stacked multi-stage converter according to an embodiment. The topology of FIG. 12 extends the topology of FIG. 11 across three phases. As can be seen, a capacitor 1250 and/or battery 1260 is shared across all phases. Thus, the benefits discussed above with reference to FIG. 11 apply to the topology of FIG. 12.

While FIGS. 11 and 12 illustrate specific topologies and PV applications, one of ordinary skill will recognize that these are merely examples, and alternative configurations would be readily apparent to one of ordinary skill without departing from the scope of the present disclosure. Additionally, while FIGS. 11 and 12 generally illustrate the use of soft-switching solid-state transformers, one of ordinary skill will recognize that the benefits of a shared capacitor and battery as described herein can be applied to other transformer topologies without departing from the scope of the present disclosure.

While certain example embodiments of the disclosed technology have been described above, it is to be understood that the disclosed technology is not to be limited to the disclosed embodiments, but on the contrary, is intended to cover various modifications and equivalent arrangements included within the scope of the appended claims and their equivalents. Although specific terms are employed herein, they are used in a generic and descriptive sense only and not for purposes of limitation. It is intended that each term contemplates its broadest meaning as understood by those skilled in the art and includes all technical equivalents that operate in a similar manner to accomplish a similar purpose.

In the above description, numerous specific details are set forth. However, it is to be understood that some embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the example embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any provided definitions of terms, it is to be understood that as used in the specification and in the claims, the term "or" is intended to mean an inclusive "or." Further, the terms "a," "an," and "the" are intended to mean one or more unless specified otherwise or clear from the context to be exclusively directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

The materials described herein as making up the various elements of some example embodiments are intended to be illustrative only and not restrictive. Many suitable materials that would perform a same or a similar function as the materials described herein are intended to be embraced within the scope of the present disclosure. Such other materials not described herein can include, but are not limited to, materials that are developed after the time of the development of the invention.

This written description uses examples to disclose certain example embodiments of the disclosed technology, including the best mode, and also to enable any person skilled in the art to practice certain embodiments of the disclosed technology, including making and using any devices or systems and performing any incorporated methods. The scope of certain embodiments of the disclosed technology is defined in the claims and their equivalents, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

An embodiment of the present disclosure may be implemented according to at least the following:

Clause 1: A soft-switching solid-state power transformer, including: a high-frequency (HF) transformer including first and second winding connections; a first auxiliary resonant circuit coupled to the first winding connection of the HF transformer, the first auxiliary resonant circuit including: a resonant capacitor coupled across the first winding connection, a resonant inductor coupled across the first winding connection in parallel with the resonant capacitor, and a damping feature coupled across the first winding connection in series with the resonant capacitor and the resonant inductor; a first current-source inverter (CSI) bridge coupled to the first auxiliary resonant circuit, the first CSI bridge including reverse blocking switches configured to conduct current in one direction and block voltage in both directions; a second auxiliary resonant circuit coupled to the second winding connection of the HF transformer; and a second CSI bridge coupled to the second auxiliary resonant circuit, the second CSI bridge including reverse blocking switches configured to conduct current in one direction and block voltage in both directions.

Clause 2: The soft-switching solid-state power transformer of Clause 1, wherein the first auxiliary resonant circuit further includes a reverse blocking switch coupled across the first winding connection in series with the resonant inductor and in parallel to the resonant capacitor.

Clause 3: The soft-switching solid-state power transformer of Clauses 1 or 2, wherein the damping feature includes a damping diode and in series to the resonant capacitor and the resonant inductor.

Clause 4: The soft-switching solid-state power transformer of Clauses 1 or 2, wherein the damping feature includes a synchronous rectifier coupled across the first winding connection in series with the resonant capacitor and the resonant inductor.

Clause 5: The soft-switching solid-state power transformer of any of Clauses 1-4, wherein the first CSI bridge includes at least two phase legs, each phase leg including a pair of the reverse blocking switches.

Clause 6: The soft-switching solid-state power transformer of Clause 5, wherein the first CSI bridge includes three-phase legs, each of the three-phase legs configured to couple to a different phase of an AC power supply.

Clause 7: The soft-switching solid-state power transformer of Clause 6, wherein the first CSI bridge further includes a fourth phase leg configured to couple to a neutral connection of the AC power supply.

Clause 8: The soft-switching solid-state power transformer of any of Clauses 5-7, wherein the at least two phase legs of the first CSI bridge are configured to couple to a single-phase AC power supply or a DC power supply.

Clause 9: The soft-switching solid-state power transformer of any of Clauses 5-8, further including a first filter coupled to the at least two phase legs of the first CSI bridge.

Clause 10: The soft-switching solid-state power transformer of any of Clauses 1-9, wherein the reverse blocking switches include an insulated gate bipolar transistor (IGBT) series with a diode or a reverse blocking IGBT (RB-IGBT).

Clause 11: The soft-switching solid-state power transformer of any of Clauses 1-10, wherein the second CSI bridge includes at least two phase legs including a pair of the reverse blocking switches.

Clause 12: The soft-switching solid-state power transformer of Clause 11, wherein the at least two phase legs are configured to couple to a load.

Clause 13: The soft-switching solid-state power transformer of Clause 12, wherein the load is a single-phase AC load or a DC load.

Clause 14: The soft-switching solid-state power transformer of Clause 12, wherein the load is a three-phase AC load, and the second CSI bridge includes three-phase legs configured to couple to different phases of the load.

Clause 15: The soft-switching solid-state power transformer of Clause 14, wherein the second CSI bridge further includes a fourth phase leg configured to couple to a neutral connection of the load.

Clause 16: The soft-switching solid-state power transformer of any of Clauses 11-15, further including a second filter coupled to the at least two phase legs of the second CSI bridge.

Clause 17: The soft-switching solid-state power transformer of any of Clauses 1-16, wherein the second auxiliary resonant circuit further includes: a resonant capacitor coupled across the second winding connection; a resonant inductor coupled across the second winding connection in parallel with the resonant capacitor of the second auxiliary resonant circuit, and a damping feature coupled across the second winding connection in series with the resonant capacitor of the second auxiliary resonant circuit and the resonant inductor of the second auxiliary resonant circuit.

Clause 18: A reactive power compensator, including: a high-frequency (HF) transformer including first, second and third winding connections; a first auxiliary resonant circuit coupled to the first winding connection of the HF transformer, the first auxiliary resonant circuit including: a resonant capacitor coupled across the first winding connection, a resonant inductor coupled across the first winding connection in parallel with the resonant capacitor, and a damping feature coupled across the first winding connection in series with the resonant capacitor and the resonant inductor; a first current-source inverter (CSI) bridge coupled to the first auxiliary resonant circuit, the first CSI bridge including reverse blocking switches configured to conduct current in one direction and block voltage in both directions; a second auxiliary resonant circuit coupled to the second winding connection of the HF transformer; a second current-source inverter (CSI) bridge coupled to the second auxiliary resonant circuit, the second CSI bridge including reverse blocking switches configured to conduct current in one direction and block voltage in both directions; a third auxiliary resonant circuit coupled to the third winding connection of the HF transformer; and a third CSI bridge coupled to the third auxiliary resonant circuit, the third CSI bridge including reverse blocking switches configured to conduct current in one direction and block voltage in both directions.

Clause 19: The reactive power compensator of Clause 18, wherein the second auxiliary resonant circuit further includes: a resonant capacitor coupled across the second winding connection; a resonant inductor coupled across the second winding connection in parallel with the resonant capacitor of the second auxiliary resonant circuit; and a damping feature coupled across the second winding connection in series with the resonant capacitor of the second auxiliary resonant circuit and the resonant inductor of the second auxiliary resonant circuit, and the third auxiliary resonant circuit further includes: a resonant capacitor coupled across the third winding connection; a resonant inductor coupled across the third winding connection in parallel with the resonant capacitor of the third auxiliary resonant circuit; and a damping feature coupled across the third winding connection in series with the resonant capacitor of the third auxiliary resonant circuit and the resonant inductor of the third auxiliary resonant circuit.

Clause 20: The reactive power compensator of Clauses 18 or 19, wherein the first auxiliary resonant circuit further includes a reverse blocking switch coupled across the first winding connection in series with the resonant inductor and in parallel to the resonant capacitor.

Clause 21: The reactive power compensator of any of Clauses 18-20, wherein the damping feature includes a damping diode coupled across the first winding connection in series to the resonant capacitor and the resonant inductor.

Clause 22: The reactive power compensator of any of Clauses 18-21, wherein the damping feature includes a synchronous rectifier coupled across the first winding connection in series with the resonant capacitor and the resonant inductor.

Clause 23: The reactive power compensator of any of Clauses 18-22, wherein the first, second, and third CSI bridges include two phase legs, each phase leg including a pair of the reverse blocking switches.

Clause 24: The reactive power compensator of Clause 23, wherein first, second, and third CSI bridges are configured to couple to different phases of a three-phase AC power supply.

Clause 25: The reactive power compensator of Clause 24 wherein the two-phase legs of each of the first, second, and third CSI bridges are configured to couple to a phase connection and a common neutral connection.

Clause 26: A soft-switching solid-state converter, including: an auxiliary resonant circuit coupled across an inductor, the auxiliary resonant circuit including: a resonant capacitor coupled across the inductor, a resonant inductor coupled across the inductor in parallel with the resonant capacitor, and a damping feature coupled across the inductor in series with the resonant capacitor and the resonant inductor; a first current-source inverter (CSI) bridge coupled across the inductor, the first CSI bridge including reverse blocking switches configured to conduct current in one direction and block voltage in both directions; and a second CSI bridge coupled across the inductor, the second CSI bridge including reverse blocking switches configured to conduct current in one direction and block voltage in both directions.

Clause 27: The soft-switching solid-state converter of Clause 26, wherein the auxiliary resonant circuit further includes a reverse blocking switch coupled across the inductor in series with the resonant inductor and in parallel to the resonant capacitor.

Clause 28: The soft-switching solid-state converter of Clauses 26 or 27, wherein the damping feature includes a damping diode coupled across the inductor in series to the resonant capacitor and the resonant inductor.

Clause 29: The soft-switching solid-state converter of any of Clauses 26-28, wherein the damping feature includes a synchronous rectifier coupled across the inductor in series with the resonant capacitor and the resonant inductor.

Clause 30: The soft-switching solid-state converter of any of Clauses 26-29, wherein the first and second CSI bridges each include at least two phase legs, each phase leg including a pair of the reverse blocking switches.

Clause 31: The soft-switching solid-state converter of Clause 30, wherein the first CSI bridge includes three-phase legs, each of the three-phase legs configured to couple to a different phase of an AC power supply.

Clause 32: The soft-switching solid-state converter of Clause 31, wherein the first CSI bridge further includes a fourth phase leg configured to couple to a neutral connection of the AC power supply.

Clause 33: The soft-switching solid-state converter of Clause 30, wherein the at least two phase legs of the first CSI bridge are configured to couple to a single-phase AC power supply or a DC power supply.

Clause 34: A stacked converter including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including first, second, and third phase legs; and a shared capacitor, the shared capacitor coupled to the second phase leg of the first CSI bridge of each of the first and second converter modules.

Clause 35: The stacked converter of Clause 34 further including a shared battery coupled to the second phase leg of the first CSI bridge of each of the first and second converter modules.

Clause 36: A stacked converter including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including first, second, and third phase legs; and a shared battery, the shared battery coupled to the second phase leg of the first CSI bridge of each of the first and second converter modules.

Clause 37: The stacked converter of any of Clauses 34-36 further including: a first photovoltaic panel connected to a first phase leg of the first converter module; and a second photovoltaic panel connected to the first phase leg of the second converter module.

Clause 38: The stacked converter of any of Clauses 34-37, wherein each of the first and second converter modules further includes: a second auxiliary resonant circuit coupled across to the second winding connection of the HF transformer, and a second current-source inverter (CSI) bridge coupled to the first auxiliary resonant circuit, the first CSI bridge including two phase legs.

Clause 39: The stacked converter of any of Clauses 34-38, wherein each first auxiliary resonant circuit includes a resonant capacitor coupled across the first winding connection.

Clause 40: The stacked converter of Clause 39, wherein each first auxiliary resonant circuit further includes: a resonant inductor coupled across the first winding connection in parallel with the resonant capacitor, and a damping feature coupled across the first winding connection in series with the resonant capacitor and the resonant inductor.

Clause 41: The stacked converter of Clause 40, wherein each first auxiliary resonant circuit further includes a reverse blocking switch coupled across the first winding connection in series with the resonant inductor and in parallel to the resonant capacitor.

Clause 42: The stacked converter of Clauses 40 or 41, wherein the damping feature of each first auxiliary resonant circuit includes a damping diode coupled across the first winding connection in series to the resonant capacitor and the resonant inductor.

Clause 43: The stacked converter of Clauses 40 or 41, wherein the damping feature of each first auxiliary resonant circuit includes a synchronous rectifier coupled across the first winding connection in series with the resonant capacitor and the resonant inductor.

Clause 44: A modular-stacked multi-stage converter including: a first stage and a second stage, each of the first stage and the second stage including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including three phase legs; and a shared capacitor, the shared capacitor coupled to the second phase leg of the first CSI bridge of each of the first and second converter modules of each of the first and second stages.

Clause 45: The modular-stacked multi-stage converter of Clause 44 further including a shared battery coupled to the second phase leg of the first CSI bridge of each of the first and second converter modules.

Clause 46: A modular-stacked multi-stage converter including: a first stage and a second stage, each of the first stage and the second stage including: a first and second converter module, each of the first and second converter modules including: a high-frequency (HF) transformer including first and second winding connections, a first auxiliary resonant circuit coupled across the first winding connection of the HF transformer, and a first current-source inverter (CSI) bridge coupled to the first auxiliary resonant circuit, the first CSI bridge including first, second, and third phase legs; and a shared battery, the shared battery coupled to the second phase leg of the first CSI bridge of each of the first and second converter modules of each of the first and second stages.

Clause 47: The modular-stacked multi-stage converter of any of Clauses 44-46, wherein each of the first and second converter modules further includes: a second auxiliary resonant circuit coupled across to the second winding connection of the HF transformer, and a second current-source inverter (CSI) bridge coupled to the first auxiliary resonant circuit, the first CSI bridge including two phase legs.

Clause 48: The modular-stacked multi-stage converter of any of Clauses 44-47, wherein each first auxiliary resonant circuit includes a resonant capacitor coupled across the first winding connection.

Clause 49: The modular-stacked multi-stage converter of Clause 48, wherein each first auxiliary resonant circuit further includes: a resonant inductor coupled across the first winding connection in parallel with the resonant capacitor, and a damping feature coupled across the first winding connection in series with the resonant capacitor and the resonant inductor.

Clause 50: The modular-stacked multi-stage converter of Clause 49, wherein each first auxiliary resonant circuit further includes a reverse blocking switch coupled across the first winding connection in series with the resonant inductor and in parallel to the resonant capacitor.

Clause 51: The modular-stacked multi-stage converter of Clauses 49 or 50, wherein the damping feature of each first auxiliary resonant circuit includes a damping diode coupled across the first winding connection in series to the resonant capacitor and the resonant inductor.

Clause 52: The modular-stacked multi-stage converter of Clauses 49 or 50, wherein the damping feature of each first auxiliary resonant circuit includes a synchronous rectifier coupled across the first winding connection in series with the resonant capacitor and the resonant inductor.

Clause 53: The modular-stacked multi-stage converter of any of Clause 44-52 further including: a first photovoltaic panel connected to a first phase leg of the first converter module; and a second photovoltaic panel connected to the first phase leg of the second converter module.

What is claimed is:

1. A soft-switching solid-state power transformer comprising:
    a high-frequency (HF) transformer comprising first and second winding connections;
    a first auxiliary resonant circuit coupled to the first winding connection of the HF transformer;
    a second auxiliary resonant circuit coupled to the second winding connection of the HF transformer;
    a first current-source inverter (CSI); and
    a second CSI bridge;
    wherein the first auxiliary resonant circuit comprises:
        a resonant capacitor coupled across the first winding connection;
        a resonant inductor coupled across the first winding connection in parallel with the resonant capacitor; and
        a damping feature coupled across the first winding connection in series with the resonant capacitor and the resonant inductor;
    wherein the first CSI bridge is coupled to the first auxiliary resonant circuit and comprises reverse blocking switches configured to conduct current in one direction and block voltage in both directions; and
    wherein the second CSI bridge is coupled to the second auxiliary resonant circuit and comprises reverse blocking switches configured to conduct current in one direction and block voltage in both directions.

2. The soft-switching solid-state power transformer of claim 1, wherein the first auxiliary resonant circuit further comprises a reverse blocking switch coupled across the first winding connection in series with the resonant inductor and in parallel to the resonant capacitor.

3. The soft-switching solid-state power transformer of claim 1, wherein the damping feature comprises a damping diode and in series with the resonant capacitor and the resonant inductor.

4. The soft-switching solid-state power transformer of claim 1, wherein the damping feature comprises a synchronous rectifier coupled across the first winding connection in series with the resonant capacitor and the resonant inductor.

5. The soft-switching solid-state power transformer of claim 1, wherein the first CSI bridge comprises at least two phase legs; and
    wherein each phase leg comprises a pair of the reverse blocking switches.

6. The soft-switching solid-state power transformer of claim 5, wherein the first CSI bridge comprises three-phase legs; and
    wherein each of the three-phase legs is configured to couple to a different phase of an AC power supply.

7. The soft-switching solid-state power transformer of claim 6, wherein the first CSI bridge further comprises a fourth phase leg configured to couple to a neutral connection of the AC power supply.

8. The soft-switching solid-state power transformer of claim 5 further comprising a first filter coupled to the at least two phase legs of the first CSI bridge.

9. The soft-switching solid-state power transformer of claim 1, wherein each of the reverse blocking switches comprise an insulated gate bipolar transistor (IGBT) series with a diode or a reverse blocking IGBT (RB-IGBT).

10. The soft-switching solid-state power transformer of claim 1, wherein the second CSI bridge comprises at least two phase legs; and
    wherein each phase leg comprises a pair of the reverse blocking switches.

11. The soft-switching solid-state power transformer of claim 10, wherein the at least two phase legs are configured to couple to a load.

12. The soft-switching solid-state power transformer of claim 11, wherein the load is a single-phase AC load or a DC load.

13. The soft-switching solid-state power transformer of claim 11, wherein the load is a three-phase AC load; and
    wherein the second CSI bridge comprises three-phase legs configured to couple to different phases of the load.

14. The soft-switching solid-state power transformer of claim 13, wherein the second CSI bridge further comprises a fourth phase leg configured to couple to a neutral connection of the load.

15. The soft-switching solid-state power transformer of claim 1 further comprising:
    a first filter; and
    a second filter;
    wherein the first CSI bridge comprises at least two phase legs;
    wherein each phase leg of the first CSI bridge comprises a pair of the reverse blocking switches;
    wherein the second CSI bridge comprises at least two phase legs;

wherein each phase leg of the second CSI bridge comprises a pair of the reverse blocking switches;
wherein the first filter is coupled to the at least two phase legs of the first CSI bridge; and
wherein the second filter is coupled to the at least two phase legs of the second CSI bridge.

16. A soft-switching solid-state power transformer comprising:
a high-frequency (HF) transformer comprising first and second winding connections;
a first auxiliary resonant circuit coupled to the first winding connection of the HF transformer;
a second auxiliary resonant circuit coupled to the second winding connection of the HF transformer;
a first current-source inverter (CSI); and
a second CSI bridge;
wherein the first auxiliary resonant circuit comprises:
  a resonant capacitor coupled across the first winding connection;
  a resonant inductor coupled across the first winding connection in parallel with the resonant capacitor; and
  a synchronous rectifier coupled across the first winding connection in series with the resonant capacitor and the resonant inductor;
wherein the second auxiliary resonant circuit comprises:
  a resonant capacitor coupled across the second winding connection;
  a resonant inductor coupled across the second winding connection in parallel with the resonant capacitor of the second auxiliary resonant circuit; and
  a damping feature coupled across the second winding connection in series with the resonant capacitor of the second auxiliary resonant circuit and the resonant inductor of the second auxiliary resonant circuit;
wherein the first CSI bridge is coupled to the first auxiliary resonant circuit and comprises reverse blocking switches configured to conduct current in one direction and block voltage in both directions; and
wherein the second CSI bridge is coupled to the second auxiliary resonant circuit and comprises reverse blocking switches configured to conduct current in one direction and block voltage in both directions.

17. A reactive power compensator, comprising:
a high-frequency (HF) transformer comprising first, second and third winding connections;
a first auxiliary resonant circuit coupled to the first winding connection of the HF transformer, the first auxiliary resonant circuit comprising:
  a resonant capacitor coupled across the first winding connection;
  a resonant inductor coupled across the first winding connection in parallel with the resonant capacitor; and
  a synchronous rectifier coupled across the first winding connection in series with the resonant capacitor and the resonant inductor;
a first current-source inverter (CSI) bridge coupled to the first auxiliary resonant circuit, the first CSI bridge comprising reverse blocking switches configured to conduct current in one direction and block voltage in both directions;
a second auxiliary resonant circuit coupled to the second winding connection of the HF transformer;
a second CSI bridge coupled to the second auxiliary resonant circuit, the second CSI bridge comprising reverse blocking switches configured to conduct current in one direction and block voltage in both directions;
a third auxiliary resonant circuit coupled to the third winding connection of the HF transformer; and
a third CSI bridge coupled to the third auxiliary resonant circuit, the third CSI bridge comprising reverse blocking switches configured to conduct current in one direction and block voltage in both directions.

18. The reactive power compensator of claim 17, wherein:
the second auxiliary resonant circuit further comprises:
  a resonant capacitor coupled across the second winding connection;
  a resonant inductor coupled across the second winding connection in parallel with the resonant capacitor of the second auxiliary resonant circuit; and
  a synchronous rectifier coupled across the second winding connection in series with the resonant capacitor of the second auxiliary resonant circuit and the resonant inductor of the second auxiliary resonant circuit; and
the third auxiliary resonant circuit further comprises:
  a resonant capacitor coupled across the third winding connection;
  a resonant inductor coupled across the third winding connection in parallel with the resonant capacitor of the third auxiliary resonant circuit; and
  a synchronous rectifier coupled across the third winding connection in series with the resonant capacitor of the third auxiliary resonant circuit and the resonant inductor of the third auxiliary resonant circuit.

19. The reactive power compensator of claim 18, wherein the first auxiliary resonant circuit further comprises a reverse blocking switch coupled across the first winding connection in series with the resonant inductor and in parallel to the resonant capacitor.

20. The reactive power compensator of claim 19, wherein the first, second, and third CSI bridges comprise two phase legs, each phase leg comprising a pair of the reverse blocking switches.

21. The reactive power compensator of claim 20, wherein first, second, and third CSI bridges are configured to couple to different phases of a three-phase AC power supply.

22. The reactive power compensator of claim 21 wherein the two-phase legs of each of the first, second, and third CSI bridges are configured to couple to a phase connection and a common neutral connection.

23. A stacked converter comprising:
a first and second converter module, each of the first and second converter modules comprising:
  a high-frequency (HF) transformer comprising first and second winding connections;
  a first auxiliary resonant circuit coupled across the first winding connection of the HF transformer, the first auxiliary resonant circuit comprising:
    a resonant capacitor coupled across the first winding connection;
    a resonant inductor coupled across the first winding connection in parallel with the resonant capacitor;
    a reverse blocking switch coupled across the first winding connection in series with the resonant inductor and in parallel to the resonant capacitor; and
    a synchronous rectifier coupled across the first winding connection in series with the resonant capacitor and the resonant inductor; and a first current-source inverter (CSI) bridge coupled to the first auxiliary resonant circuit, the first CSI bridge comprising first, second, and third phase legs; and a shared capacitor, the shared capacitor coupled to the second phase leg of the first CSI bridge of each of the first and second converter modules.

24. The stacked converter of claim 23 further comprising a shared battery coupled to the second phase leg of the first CSI bridge of each of the first and second converter modules.

25. The stacked converter of claim 23 further comprising:
a first photovoltaic panel connected to a first phase leg of the first converter module; and
a second photovoltaic panel connected to the first phase leg of the second converter module.

26. The stacked converter of claim 23, wherein each of the first and second converter modules further comprises:
a second auxiliary resonant circuit coupled across to the second winding connection of the HF transformer, and
a second current-source inverter (CSI) bridge coupled to the first auxiliary resonant circuit, the first CSI bridge comprising two phase legs.

27. A stacked converter comprising:
a first and second converter module, each of the first and second converter modules comprising:
a high-frequency (HF) transformer comprising first and second winding connections;
a first auxiliary resonant circuit coupled across the first winding connection of the HF transformer; and
a first current-source inverter (CSI) bridge coupled to the first auxiliary resonant circuit, the first CSI bridge comprising first, second, and third phase legs;
wherein the first auxiliary resonant circuit comprises:
a resonant capacitor coupled across the first winding connection;
a resonant inductor coupled across the first winding connection in parallel with the resonant capacitor; and
a damping feature coupled across the first winding connection in series with the resonant capacitor and the resonant inductor; and
a shared battery, the shared battery coupled to the second phase leg of the first CSI bridge of each of the first and second converter modules.

28. The stacked converter of claim 27, wherein the damping feature of each first auxiliary resonant circuit comprises a damping diode coupled across the first winding connection in series to the resonant capacitor and the resonant inductor.

29. The stacked converter of claim 27, wherein the damping feature of each first auxiliary resonant circuit comprises a synchronous rectifier coupled across the first winding connection in series with the resonant capacitor and the resonant inductor.

30. A modular-stacked multi-stage converter comprising:
a first stage and a second stage, each of the first stage and the second stage comprising:
a first and second converter module, each of the first and second converter modules comprising:
a high-frequency (HF) transformer comprising first and second winding connections;
a first auxiliary resonant circuit coupled across the first winding connection of the HF transformer; and
a first current-source inverter (CSI) bridge coupled to the first auxiliary resonant circuit, the first CSI bridge comprising three phase legs;
wherein the first auxiliary resonant circuit comprises:
a resonant capacitor coupled across the first winding connection;
a resonant inductor coupled across the first winding connection in parallel with the resonant capacitor; and
a damping feature coupled across the first winding connection in series with the resonant capacitor and the resonant inductor; and
a shared capacitor, the shared capacitor coupled to the second phase leg of the first CSI bridge of each of the first and second converter modules of each of the first and second stages.

31. The modular-stacked multi-stage converter of claim 30, wherein each first auxiliary resonant circuit further comprises a reverse blocking switch coupled across the first winding connection in series with the resonant inductor and in parallel to the resonant capacitor.

32. The modular-stacked multi-stage converter of claim 30, wherein the damping feature of each first auxiliary resonant circuit comprises a damping diode coupled across the first winding connection in series to the resonant capacitor and the resonant inductor.

33. The modular-stacked multi-stage converter of claim 30, wherein the damping feature of each first auxiliary resonant circuit comprises a synchronous rectifier coupled across the first winding connection in series with the resonant capacitor and the resonant inductor.

* * * * *